(12) United States Patent
Lyons et al.

(10) Patent No.: US 11,138,870 B1
(45) Date of Patent: Oct. 5, 2021

(54) ON-DEMAND ROADWAY CROSSING

(71) Applicant: International Business Machines Corporation, Armonk, NY (US)

(72) Inventors: John A. Lyons, Ottawa (CA); Ilse M. Breedvelt-Schouten, Manotick (CA); Jana H. Jenkins, Raleigh, NC (US); Jeffrey A. Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/935,701

(22) Filed: Jul. 22, 2020

(51) Int. Cl.
  *G08G 1/005* (2006.01)
  *G08G 1/09* (2006.01)
  *H04W 4/029* (2018.01)

(52) U.S. Cl.
  CPC ............. *G08G 1/005* (2013.01); *G08G 1/09* (2013.01); *H04W 4/029* (2018.02)

(58) Field of Classification Search
  None
  See application file for complete search history.

(56) References Cited

U.S. PATENT DOCUMENTS

| | | | |
|---|---|---|---|
| 6,384,742 B1 | 5/2002 | Harrison | |
| 2014/0172226 A1* | 6/2014 | Goerick | B60T 7/22 701/28 |
| 2015/0228195 A1* | 8/2015 | Beaurepaire | B60Q 1/50 340/907 |
| 2018/0096605 A1* | 4/2018 | Bai | G08G 1/161 |
| 2018/0276986 A1* | 9/2018 | Delp | G08G 1/005 |
| 2019/0053154 A1 | 2/2019 | Song | |
| 2019/0351896 A1* | 11/2019 | Solmaz | H04W 4/38 |
| 2020/0023842 A1* | 1/2020 | Gutierrez | G06K 9/00805 |

OTHER PUBLICATIONS

"A method for security reminder around intersections in people's daily life", IP.com No. IPCOM000258865D, IP.com Electronic Publication Date: Jun. 20, 2019, 3 pps., <https://priorart.ip.com/IPCOM/000258865>.

"Pedestrian crossing", Wikipedia, 27 pps., Feb. 18, 2020, <https://en.wikipedia.org/wiki/Pedestrian_crossing>.

(Continued)

*Primary Examiner* — Brent Swarthout
(74) *Attorney, Agent, or Firm* — David K. Mattheis; Maeve M. Carpenter

(57) ABSTRACT

In response to receiving a request from a user device for an on-demand crossing of a roadway at a geo-location, a method determines whether connected vehicles on the roadway are approaching the geo-location. A wait-to-cross-the-roadway message is sent to the user's device. In response to determining connected vehicles are approaching the geo-location, a direction, distance, and speed of connected vehicles relative to the geo-location are determined. Instructions are sent to the connected vehicles to reduce speed and allow the user to cross the roadway, including a message to the user device explaining a purpose of the instructions. In response to determining the one or more connected vehicles comply with the instructions, the one or more processors send a safe-to-cross message to the user, and upon detecting successful roadway crossing of the user device, instructing the connected vehicles to resume travel.

20 Claims, 3 Drawing Sheets

(56) References Cited

OTHER PUBLICATIONS

"Vehicle-to-Vehicle Communication, U.S. Department of Transportation", National Highway Traffic Safety Administration, Jan. 2017, 2 pps., <https://www.nhtsa.gov/technology-innovation/vehicle-vehicle-communicatio>.

"What's the Deal With 'Unmarked Crosswalks'?", , Walkable Princeton, Blog at WordPress.com, May 30, 2013, 2 pps., <https://walkableprinceton.com/2013/05/30/traffic_quiz1/>.

"Wikipedia, Traffic Break", Sep. 29, 2019, 2 pps., <https://en.wikipedia.org/wiki/Traffic_break>.

Khosravi et al., "Assistive System to Improve Pedestrians' Safety and Mobility in a Connected Vehicle Technology Environment" Journal of the Transportation Research Board, Copyright National Academy of Sciences: Transportation Research Board 2018, 12 pps., <https://journals.sagepub.com/doi/abs/10/1177/0361198118783598?journalCode=trra>.

Frost, "Cohda's V2X technology equips Bercman's Smart Crosswalk system", Mar. 12, 2019, 4 pps., Traffic Technology Today, <https://www.traffictechnologytoday.com/news/connected-vehicles-infrastructure/cohdas-v2x- technology-equips-bercmans-smart-crosswalk-system.html>.

Zhenyu et al., "Design and evaluation of V2X communication system for vehicle and pedestrian safety", Dec. 2015, 22(6): 18-26, The Journal of China Universities of Posts and Telecommunications, <https://www.researchgate.net/publication/291949549>.

Turck, "Why Not Both? Dynamic Crosswalks to Optimize Pedestrian Choice and Vehicle Throughput", Pittsburgh Challenge, City One Challenge, Aug 28, 2018, 6 pps., <https://challenges.cityoftomorrow.com/challenge/pittsburgh/propose/why-not-both-dynamic-crosswalks-to-optimize-pedestrian-choice-and-vehicle-throughput>.

\* cited by examiner

ON-DEMAND ROADWAY CROSSING

FIELD OF THE INVENTION

The present invention relates generally to the field of connected communication of devices, and more particularly to creating a safe on-demand crosswalk by coordinated actions of communicatively connected vehicles.

BACKGROUND OF THE INVENTION

Urban environments are often structured in rectangular areas divided by parallel and perpendicular roadways, forming "blocks". The urban roadways are notoriously known for heavy and persistent traffic, which requires special infrastructure for controlling and guiding both vehicle and pedestrian traffic. Urban areas predominately include crosswalks at roadway intersections, which often include traffic signals and visual and audio devices to indicate when it is appropriate for pedestrians to cross the roadway from one side to the other.

Urban crosswalks rely on pedestrian knowledge and familiarity with the guidance infrastructure indicating when roadway crossing, speed of crossing, and waiting is appropriate. Similarly, there is a reliance on the vehicle drivers to have knowledge and practice compliance with rules of the road, right-of-way priorities, and common sense. Although crosswalks are most commonly located at roadway intersection corners, pedestrian travel to destinations after crossing the roadway is relatively short, as defined by the distance between intersections.

SUMMARY

Embodiments of the present invention disclose a method, computer program product, and system. The embodiments include a method to create a safe crosswalk on demand. The method includes one or more processors that determine, in response to receiving a request from a first device of a user to create an on-demand crosswalk on a roadway at a geo-location, whether connected vehicles on the roadway are approaching the geo-location of the user. The one or more processors send a message to wait to cross the roadway to the first device of the user. The one or more processors determine, in response to determining that the connected vehicles are approaching the geo-location of the user, a distance of connected vehicles from the user and a travel speed of connected vehicles. The one or more processors send a first instruction to the one or more connected vehicles to reduce speed to allow the user to cross the roadway, including a communication explaining a purpose of the first instruction to reduce speed. The one or more processors determine whether the one or more connected vehicles comply with the first instruction, and in response to determining the one or more connected vehicles comply with the first instruction, the one or more processors send a safe-to-cross message to the user.

DETAILED DESCRIPTION

Figure 1:
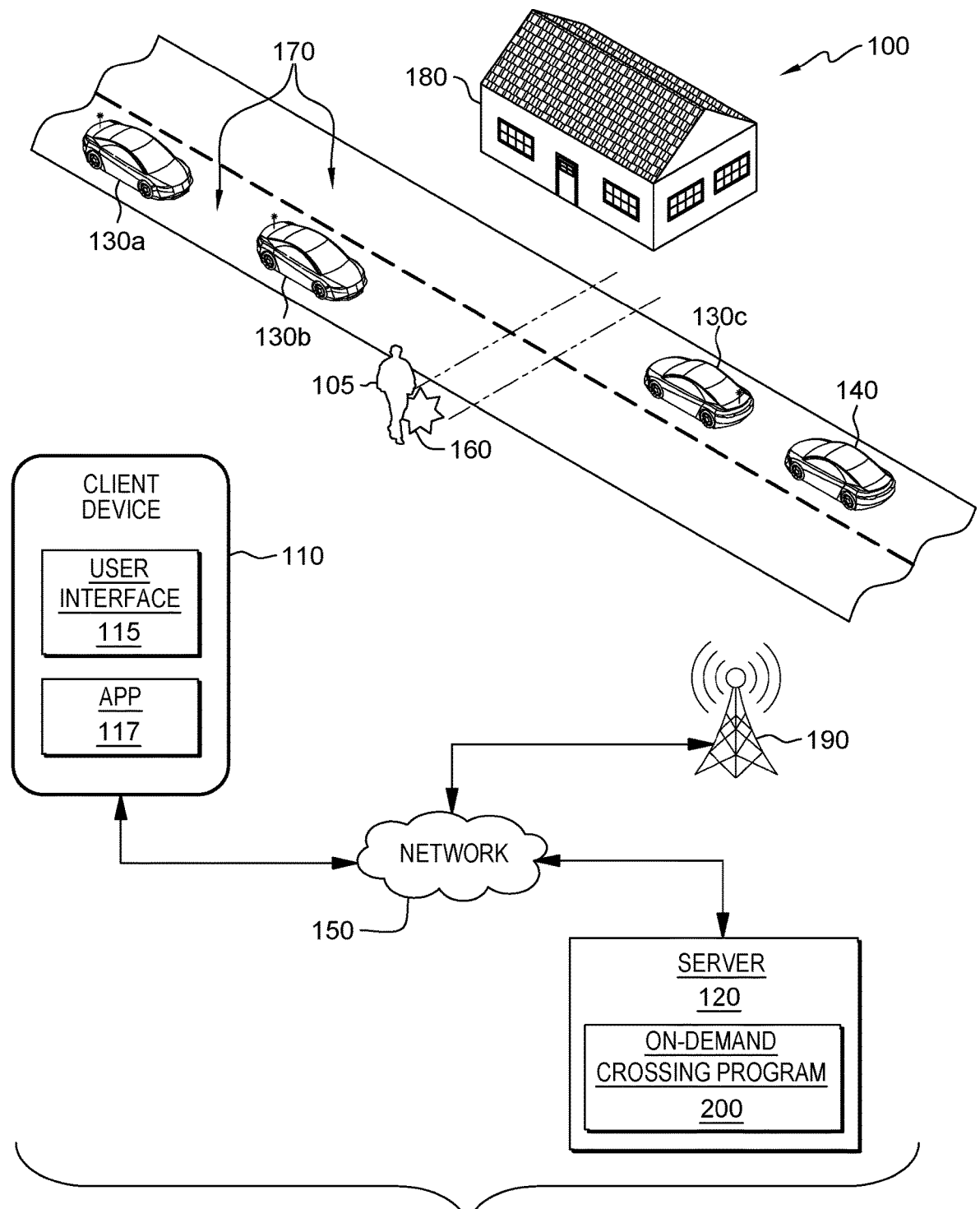
FIG. 1 is a functional block diagram illustrating a distributed data processing environment, in accordance with an embodiment of the present invention.

Embodiments of the present invention recognize that marked crosswalks located in urban environments include infrastructure, such as traffic signals and crosswalk signals, to organize and enable the pedestrian crossing of roadways. Crosswalks are predominately located at intersections and offer convenience due to relatively short distances between intersections. Embodiments also recognize the safety of pedestrians crossing a roadway at an urban intersection is not guaranteed, and is dependent on manual compliance of vehicle drivers and pedestrians to traffic signals, rules-of-the-road, and compliance with right-of-way laws.

Embodiments of the present invention recognize that in non-urban areas, crosswalks with infrastructure supporting pedestrian crossing of high-traffic roadways are scarce or absent altogether. Embodiments further recognize that pedestrian access to destinations on an opposite side of a suburban or rural high-traffic roadway presents significant, and possible serious risks and intersection intervals that include traffic signals may be impractically separated for use in roadway crossing.

Embodiments of the present invention provide a method, computer program product, and computer system for safe on-demand crossing of a roadway. Embodiments provide for a cloud-hosted program working in concert with a smart mobile device of the requesting user, and an application (app) operating on the smart device, to receive a user request to cross a roadway at an identified geo-location corresponding to the mobile device of the user. The user location relative to a side of the roadway is determined along with the geo-location determined in response to the receipt of the request. Embodiments determine the presence, distance, and speed of vehicles communicatively connected on the roadway, as well as the presence and position of non-connected vehicles, relative to the geo-location of the requesting user. Embodiments communicate instructions to the connected vehicles to reduce speed, enabling the requesting user to safely cross the roadway at the geo-location after confirming compliance of the instructions to the connected vehicles.

In some embodiments, a message accompanies the instructions to the connected vehicles explaining the purpose of reducing speed or stopping altogether, and the smart device of the requesting user receives an instructive message on the user's smart device to wait to cross the roadway until safe conditions are met. In some embodiments, vehicles are communicatively connected by one or more communication media technologies, such as 4G, LTE, 5G, WiFi, radio signal, or other wireless communication media. The communication media enables transmission of the identification of the vehicle, the position of the vehicle, the traveling speed and direction of the vehicle relative to the geo-location of the smart device of the requesting user, and instructions to the connected vehicles. In some embodiments, the smart device location is determined by global positioning service (GPS) functions of the device, and the location is communicated to establish the geo-location of the on-demand crosswalk.

In some embodiments, the connected vehicles are autonomous vehicles and the instructions to reduce speed and possibly stop altogether are automatically performed. In other embodiments, the instruction is received and presented to the driver of the connected vehicle to perform and includes an explanation message regarding the instruction to reduce speed or stop.

In some embodiments, the connected vehicles are instructed to determine whether non-connected vehicles are located within a predetermined proximity of the respective connected vehicle. The connected vehicles determine non-connected vehicles within the predetermined proximity by identifying vehicles by optical sensors, cameras with object identification functionality, light detection and ranging (Lidar) sensors, sonar sensors, radar sensors, or ultrasound sensors. The positioning of sensors on the connected vehicle establishes the relative position of the detected non-connected vehicle. In some embodiments, the connected vehicles receive instructions to determine whether a non-connected vehicle is positioned between the respective connected vehicles and the geo-location of the requested crosswalk. Confirming the position of the non-connected vehicle to be between the connected vehicles and the geo-location, the respective connected vehicles are instructed to determine whether a connected vehicle can re-position between the non-connected vehicle and the geo-location, to effectively control the progress of the non-connected vehicle as it approaches the geo-location.

In some embodiments of the present invention, a message to safely proceed to cross the roadway is sent to the smart device of the requesting user subsequent to confirming the connected vehicles and non-connected vehicles obstructed by connected vehicles have reduced speed and/or stopped enabling safe crossing. In some embodiments, the position of the user indicating the user has completed the crossing of the roadway is determined by tracking of the smart device of the user as located on the opposite side of the roadway when compared to the location of the device of the user at receipt of the request. Subsequent to confirming the successful crossing of the roadway by the requesting user, an instruction to resume travel is sent to the connected vehicles. In some embodiments, the user may cancel the request to cross the roadway, and the instruction to resume travel is delivered to the connected vehicles. In other embodiments, the instruction to continue travel is delivered after a predetermined duration of time and confirmation of the location of the requesting user remaining on the original side of the roadway when the request to cross was received.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes illustration of non-connected vehicle 140, geo-location 160, roadway 170, and destination building 180. Distributed data processing environment 100 also includes requesting user 105, client device 110, server 120, connected vehicles 130a, 130b, 130c, and transmission tower 190, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communications between client device 110, server 120, connected vehicles 130a, 130b, and 130c, in accordance with embodiments of the present invention.

Requesting user 105 is positioned at geo-location 160 on one side of roadway 170. Requesting user operates client device 110, which includes application (app) 117, accessible via user interface 115. Requesting user 105 initiates a request for an on-demand crosswalk at geo-location 160 via app 117 of client device 110. Requesting user 105 views messages on user interface 115 of client device 110 informing requesting user 105 of conditions for safe crossing of roadway 170.

Client device 110 is a smart computing device including user interface 115 and app 117. Client device 110 communicates with on-demand crossing program 200 operating on server 120 via network 150. In some embodiments, client device 110 is configured to indicate the geo-location of client device 110, such as through communication signal triangulation or a GPS feature. In some embodiments, client device 110 may be a laptop computer, a tablet computer, a smartphone, smartwatch, a wearable computing device, or any programmable electronic mobile device capable of communicating with various components and devices within distributed data processing environment 100, via network 150. In general, client device 110 represents one or more programmable electronic devices or a combination of programmable electronic devices capable of executing machine-readable program instructions and communicating with on-demand crossing program 200, server 120, transmission tower 190, and other computing devices (not shown) within distributed data processing environment 100 via a network, such as network 150. Client device 110 may include internal and external hardware components, depicted in more detail in FIG. 3.

User interface 115 provides an interface to access the features and functions of client device 110. In some embodiments of the present invention, user interface 115 provides access to on-demand crossing program 200, operating on server 120, and app 117. User interface 115 may also support access to other applications, features, and functions of client device 110 (not shown). In some embodiments, user interface 115 provides display output and input functions for client device 110.

User interface 115 supports access to alerts, notifications, and provides forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of client device 110. User interface 115 enables respective users of client device 110 to receive, view, hear, and respond to input, access applications, display content of online conversational exchanges, and perform available functions.

Application (app) 117 is a communication module component of on-demand crossing program 200. In some embodiments, app 117 initiates a request by requesting user 105 connecting with on-demand crossing program 200. App 117 receives messaging from on-demand crossing program 200 indicating whether requesting user 105 should wait to cross roadway 170 or that conditions are safe for requesting user 105 to cross the roadway.

Server 120 is a remote computing device depicted as including on-demand crossing program 200. In some embodiments of the present invention, server 120 represents a virtual computing device operating based on multiple computers as a server system, such as in a cloud computing environment, and provides access and connectivity of client device 110 to authentication program 200 and other function and resources residing on server 120, via network 150.

In some embodiments, server 120 can be a web server, a blade server, a desktop computer, a laptop computer, a tablet computer, a netbook computer, or any other programmable electronic computing device capable of receiving, sending, and processing data, and communicating with features and functions of client device 110, app 117, and connected vehicles 130a, 130b, and 130c, via transmission tower 190, and other computing devices (not shown) within distributed data processing environment 100 via network 150. In another embodiment, server 120 represents a computing system utilizing clustered computers and components (e.g., database server computers, application server computers, etc.) that act as a single pool of seamless resources when accessed within distributed data processing environment 100. Server 120 may include internal and external hardware components, as depicted in more detail and described in FIG. 3.

On-demand crossing program 200 is depicted as hosted and operating from server 120. On-demand crossing program 200 interacts with app 117 operating on client device 110 and is communicatively connected to connected vehicles 130a, 130b, and 130c, via transmission tower 190 and network 150. In embodiments of the present invention, on-demand crossing program 200 receives a request for an on-demand crosswalk from app 117 on client device 110 operated by requesting user 105. The request includes a location, such as geo-location 160, of client device 110. On-demand crossing program 200 communicates with connected vehicles 130a, 130b, and 130c to determine a location, direction of travel, speed, and distance from geo-location 160 (i.e., travel attributes), respectively, of connected vehicles 130a, 130b, and 130c.

In some embodiments, on-demand crossing program 200 determines whether non-connected vehicles are on the roadway in the vicinity of connected vehicles 130a, 130b, and 130c. On-demand crossing program 200 instructs connected vehicles 130a, 130b, and 130c to use installed sensors to determine whether a vehicle is within a predetermined range of the respective connected vehicle and the relative position of the detected vehicle (i.e., in front of, behind, beside, the connected vehicle and an approximation of distance from the respective connected vehicle, speed, and direction). In some embodiments, sensors installed on connected vehicles 130a, 130b, and 130c include one or a combination of optical sensors, cameras with object identification functionality, light detection and ranging (Lidar) sensors, sonar sensors, radar sensors, or ultrasound sensors.

On-demand crossing program 200 determines the location, direction, speed, distance from geo-location 160, and position relative to connected vehicles 130a, 130b, and 130c (i.e., non-connected vehicle travel attributes) based on information collectively received from connected vehicles 130a, 130b, and 130c. On-demand crossing program 200 directly receives the position and travel attributes of connected vehicles 130a, 130b, and 130c and determines the travel attributes of the non-connected vehicles, such as non-connected vehicle 140, based on the relative sensor data received from connected vehicles 130a, 130b, and 130c.

In some embodiments of the present invention, on-demand crossing program 200 instructs connected vehicles 130a, 130b, and 130c to determine whether connected vehicles 130a, 130b, and 130c can maneuver to a position to be in front of non-connected vehicles, such as non-connected vehicle 140. In some embodiments, one or more vehicles of connected vehicles 130a, 130b, and 130c perform an adjustment of position in front of non-connected vehicle 140 and sends notification of the position adjustment to on-demand crossing program 200. If an adjustment of connected vehicles 130a, 130b, or 130c in front of non-connected vehicle 140 is not possible, then connected vehicles 130a, 130b, and 130c notify on-demand crossing program 200 that non-connected vehicle 140 is positioned ahead of connected vehicles 130a, 130b, and 130c and headed in a direction towards geo-location 160. In response, on-demand crossing program 200 sends a warning to client device 110, displayed on user interface 115 that it is not safe to cross, and maintains the message until non-connected vehicle 140 passes geo-location 160 and connected vehicles 130a, 130b, and 130c are confirmed as reducing speed or stopping to enable requesting user 105 to cross roadway 170 at geo-location 160.

Connected vehicles 130a, 130b, and 130c are communicatively connected to on-demand crossing program 200 on server 120 via transmission tower 190 and network 150. In some embodiments, connected vehicles 130a, 130b, and 130c receive wireless communication from on-demand crossing program 200 that includes an instruction to reduce speed and/or stop prior to reaching geo-location 160 to enable requesting user 105 to safely cross roadway 170. In some embodiments, connected vehicles 130a, 130b, and 130c receive instructions and a message explaining the instructions and rely on a driver of respective vehicles to reduce speed and enable requesting user 105 to cross roadway 170. In other embodiments, connected vehicles 130a, 130b, and 130c are autonomous vehicles, and the instructions received from on-demand crossing program 200 are automatically applied, along with a message explaining the autonomous action. In some embodiments, the message explaining the instructions or autonomous action is delivered audibly, in other embodiments, the message is delivered in text positioned to enable the manual driver's attention to remain on roadway 170.

Non-connected vehicle 140 is a vehicle traveling on roadway 170. The travel attributes of non-connected vehicle 140 are obtained by sensor data from one or more respective vehicles of connected vehicles 130a, 130b, and 130c, and the relative travel attributes of connected vehicles 130a, 130b, and 130c sending data regarding non-connected vehicle 140. In some embodiments, one or more of connected vehicles 130a, 130b, and 130c is instructed to determine if an adjustment can be made to position one or more of connected vehicles 130a, 130b, and 130c in front of non-connected vehicle 140 (and other non-connected vehicles—not shown). In response to receiving a confirmation that one or more of connected vehicles 130a, 130b, and 130c is safely able to re-position in front of non-connected vehicle 140, on-demand crossing program 200 confirms the re-positioning instruction. Positioning one or more of connected vehicles 130a, 130b, and 130c in front of non-connected vehicle 140 provides a safe blocking effect for roadway crossing as connected vehicles 130a, 130b, and 130c perform reduction of speed and/or stop.

Geo-location 160 is the on-demand physical location at which requesting user 105 initiates a request to on-demand crossing program 200 to cross roadway 170 via app 117 on client device 110. In some embodiments of the present invention, situations in which multiple users (not shown) requesting on-demand crosswalks may be instructed by on-demand crossing program 200 to merge for a combined crossing, based on a pre-determined and configurable distance threshold between requesting users.

Roadway 170 represents a vehicle traveled road in a suburban or rural location, which is absent intersections, traffic lights and formal crosswalks to aid pedestrian traffic to access destinations on either side of the road. In some embodiments, roadway 170 includes periods of high traffic and may include vehicles traveling at high speeds, making safe crossing difficult and potentially dangerous. In some embodiments, roadway 170 may include multi-lane vehicle traffic in one or two directions.

Destination building 180 represents the desired destination on one side of roadway 170 for users on the opposite side of roadway 170. In some embodiments, destination building 180 may be a store, a work location, a school, a medical facility, a public building, a laundromat, or other structure offering a product, benefit, or service desired by requesting user 105 positioned at geo-location 160 on the opposite side of roadway 170. In other embodiments, other destinations desired by users located on the opposite side of roadway 170 may include a park, a trail, or other outdoor sites offering benefit or service to requesting user 105.

Transmission tower 190 is a structure that enables wireless communication to connected vehicles 130a, 130b, and 130c to and from on-demand crossing program 200 and app 117 of client device 110, via network 150. In some embodiments, transmission tower 190 may represent a cluster of transmission towers supporting wireless communication over a predefined region and may be connected to other clusters of transmission towers (not shown). In some embodiments, transmission tower 190 may transmit one or more communication media technologies, such as 4G, LTE, 5G, WiFi, radio signal, or other wireless communication media.

Figure 2:
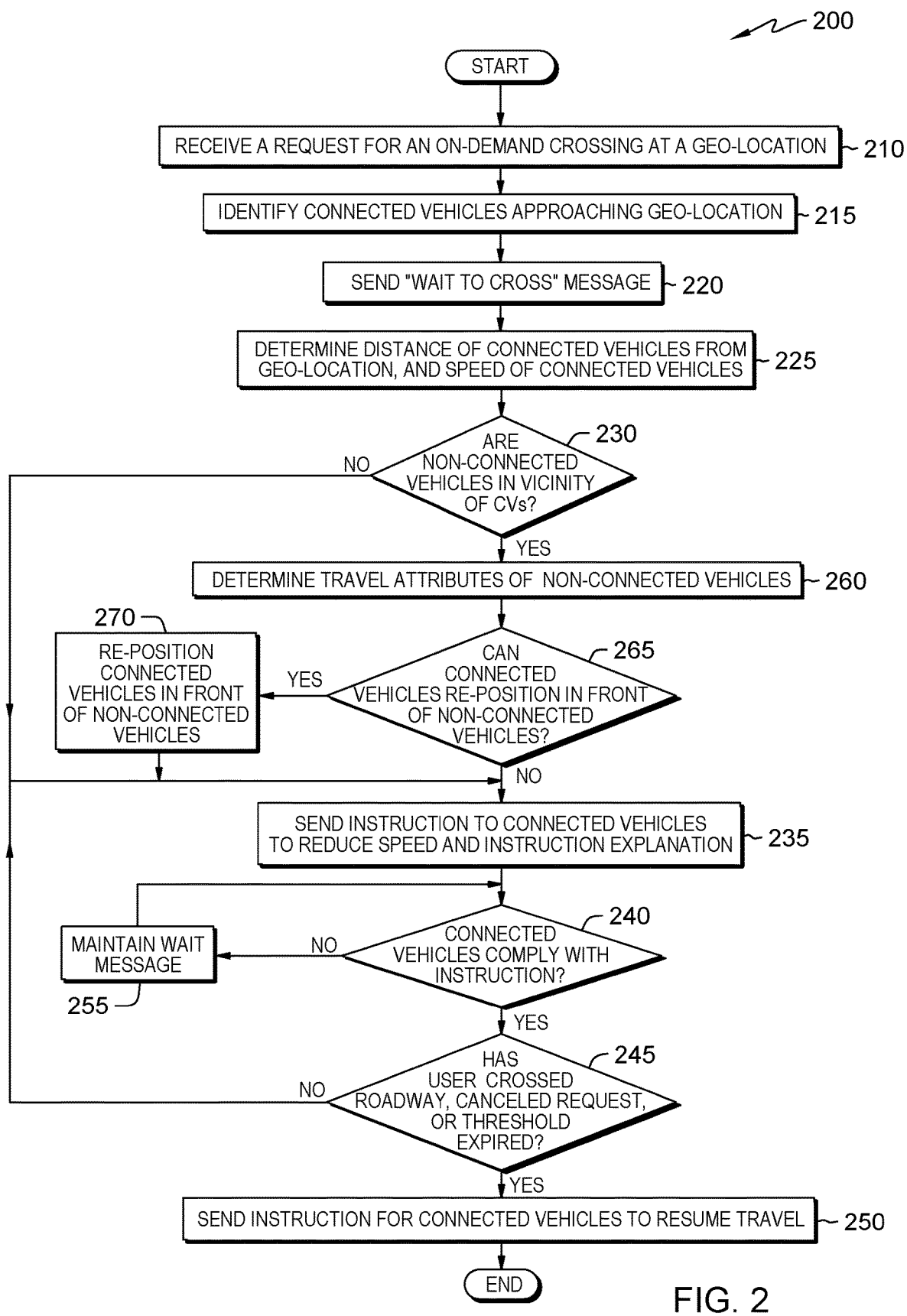
FIG. 2 is a flowchart depicting operational steps of a crosswalk program, operating in the distributed data processing environment of FIG. 1, in accordance with embodiments of the present invention.

FIG. 2 is a flowchart depicting operational steps of on-demand crossing program 200, operating in distributed data processing environment 100 of FIG. 1, in accordance with embodiments of the present invention. On-demand crossing program 200 provides safe roadway crossing conditions in response to receiving an on-demand request by communicating instructions to communicatively connected vehicles on the roadway and sending crossing status messages to a smart device of the requesting user.

On-demand crossing program 200 receives a request for an on-demand crossing at a geo-location (step 210). On-demand crossing program 200 receives a request from an app on a smart device of a requesting user at a geo-location identified by a GPS function of the smart device operated by the user. The smart device includes an app that initiates and sends the request for crossing a roadway at the geo-location to on-demand crossing program 200.

For example, requesting user 105 (FIG. 1) initiates a request for an on-demand crosswalk for crossing roadway 170 at geo-location 160 by using app 117 on client device 110. On-demand crossing program 200 receives the request for crossing roadway 170 from app 117 and determines the location of geo-location 160 by GPS data included in the request from client device 110, and determines the relative side of roadway 170 on which client device 110 is located. In some embodiments, geo-location 160 may include pre-defined regions in which a request for an on-demand crossing of roadway 170 is accepted.

On-demand crossing program 200 identifies connected vehicles (CVs) that are approaching the geo-location (decision step 215). On-demand crossing program 200 communicates with connected vehicles and determines an identification associated with each respective connected vehicle and determines whether the connected vehicles are traveling on the roadway the requesting user intends to cross. On-demand crossing program 200 identifies and locates the connected vehicles based on location data received from each respective connected vehicle, and compares the location of the respective connected vehicles relative to the GPS data of the geo-location of the user's smart device. On-demand crossing program 200 determines which of the connected vehicles are traveling on the roadway associated with the geo-location of the requesting user and are approaching the geo-location.

For example, on-demand crossing program 200 communicates with connected vehicles within the communication range of a cluster of transmission towers, such as transmission tower 190. On-demand crossing program 200 identifies a plurality of connected vehicles, including connected vehicles 130a, 130b, and 130c. On-demand crossing program 200 determines that connected vehicles 130a, 130b, and 130c are traveling on roadway 170 which is adjacent to geo-location 160 and are respectively approaching geo-location 160 from both directions on roadway 170.

On-demand crossing program 200 sends a "wait to cross" message to the user interface of the smart device of the requesting user (decision step 220). In response to identifying connected vehicles approaching the geo-location at which the requesting user intends to cross the roadway, on-demand crossing program 200 sends a message to the smart device of the requesting user, displaying the message to "wait to cross" the roadway on the user interface of the requesting user's smart device.

For example, on-demand crossing program 200 identifies connected vehicles 130a and 130b approaching geo-location 160 from one direction on roadway 170 and identifies connected vehicle 130c approaching geo-location 160 from the other direction of roadway 170. On-demand crossing program 200 sends a message to "wait to cross" to user interface 115 on client device 110 of requesting user 105.

On-demand crossing program 200 determines the travel attributes of connected vehicles approaching the geo-location (step 225). On-demand crossing program 200 communicates with the connected vehicles to determine the respective travel attributes of the connected vehicles. In some embodiments of the present invention, the travel attributes of the connected vehicles include tracking of a location, direction of travel, speed, and distance of the respective connected vehicle from the geo-location of the requesting user. For example, on-demand crossing program 200 communicates with connected vehicles 130a, 130b, and 130c and receives data from each respective connected vehicle that includes the GPS location of the vehicle, the direction of travel, the current speed, and calculation by on-demand crossing program 200 of the distance of each respective vehicle from geo-location 160.

On-demand crossing program 200 determines whether non-connected vehicles are in a predetermined vicinity of the (CVs) connected vehicles (decision step 230). On-demand crossing program 200 determines non-connected vehicle presence by instructing connected vehicles to operate installed sensors on respective connected vehicles and return the data to on-demand crossing program 200. In some embodiments, sensor data from respective connected vehicles includes data from one or more of optical sensors, cameras configured with optical recognition functionality, radar sensors, LiDAR sensors, sonar sensors, and ultrasound sensors. The sensor data from respective connected vehicles detects non-connected vehicles within a predetermined vicinity of the respective connected vehicle. On-demand crossing program 200 receives the sensor data from the connected vehicles, and for the case in which non-connected vehicles are not detected in the predetermined vicinity of respective connected vehicles (step 230, "NO" branch), on-demand crossing program 200 sends an instruction to the connected vehicles approaching the geo-location of the requesting user to reduce speed and includes a message explaining the instruction to reduce speed (step 235).

In some embodiments of the present invention, the connected vehicles are partially or fully operated by manual operation of the vehicle by a driver. On-demand crossing program 200 sends the instruction to the connected vehicles such that the driver receives the instruction to reduce speed and/or stop while approaching the geo-location of the requested roadway crossing, and the driver receives a message from on-demand crossing program 200 explaining the instruction to reduce speed is based on a request for a pedestrian crossing of the roadway ahead.

In some embodiments, the connected vehicles are autonomous vehicles and the instructions from on-demand crossing program 200 automatically reduce the speed of the connected vehicles while approaching the geo-location of the requested roadway crossing. In some embodiments, on-demand crossing program 200 delivers the instructions to manually-driven connected vehicles as audible instructions. In other embodiments, on-demand crossing program 200 delivers the instructions and explanation to the connected vehicles as a text-based message. In yet other embodiments, on-demand crossing program 200 delivers the instructions to reduce speed and the explanation for the instructions to the manually-driven connected vehicles in both an audible and text-based format.

For example, on-demand crossing program 200 sends instructions and an explanation of the instructions to connected vehicles 130a, 130b, and 130c. The instructions are to reduce speed and/or stop as the respective vehicles approach geo-location 160, and the message indicates a pedestrian crossing of roadway 170 has been requested. In the current example, connected vehicles 130a and 130b are manually-driven connected vehicles and receive audible instructions to begin reducing speed and to stop within a designated distance prior to reaching geo-location 160, and an audible explanation of a roadway crossing request ahead. In the current example, connected vehicle 130c is an autonomous vehicle and instructions sent from on-demand crossing program 200 to connected vehicle 130c automatically reduce the speed of the vehicle and include an audible and text message explaining the requested roadway crossing ahead.

For the case in which on-demand crossing program 200 determines the presence of non-connected vehicles in the vicinity of the connected vehicles (step 230, "YES" branch), on-demand crossing program 200 determines the travel attributes of the non-connected vehicles in the vicinity of the connected vehicles (step 260). On-demand crossing program 200 instructs the connected vehicles to obtain and return sensor data associated with the detection of non-connected vehicles within a predetermined vicinity of the respective connected vehicles. On-demand crossing program 200 receives the sensor data associated with the non-connected vehicles from the connected vehicles. On-demand crossing program 200 performs analysis on the received sensor data and determines the travel attributes of the non-connected vehicles, which include a location, a direction of travel, speed, and the position of non-connected vehicles relative to the respective connected vehicles.

For example, on-demand crossing program 200 operating on server 120 sends a request to connected vehicles 130a, 130b, and 130c to generate and return sensor data for detection of non-connected vehicles within a predetermined vicinity of the respective connected vehicles. On-demand crossing program 200 receives the sensor data collected and transmitted from connected vehicles 130a, 130b, and 130c, via transmission tower 190 and network 150. On-demand crossing program 200 determines whether the sensor data indicates the presence of non-connected vehicles within the predetermined vicinity of the connected vehicles, defined by the effective range of the sensors available on the connected vehicles 130a, 130b, and 130c. Based on the received sensor data of connected vehicles 130a, 130b, and 130c, on-demand crossing program 200 determines that non-connected vehicles are present within the predetermined vicinity of connected vehicles 130a, 130b, and 130c. On-demand crossing program 200 further analyzes the transmitted sensor data from connected vehicles 130a, 130b, and 130c associated with the detected non-connected vehicles and determined the travel attributes of the non-connected vehicles, including location, travel direction, speed, and relative position to connected vehicles 130a, 130b, and 130c.

On-demand crossing program 200 determines whether the connected vehicles can re-position in front of the non-connected vehicles (decision step 265). In some embodiments, on-demand crossing program 200 instructs one or more of connected vehicles 130a, 130b, and 130c to determine if an adjustment can be made to position one or more of connected vehicles 130a, 130b, and 130c in front of non-connected vehicle 140 (and possibly other non-connected vehicles—not shown). On-demand crossing program 200 determines whether the one or more connected vehicles can maneuver to re-position in front of a non-connected vehicle, based on the sensor data received from the connected vehicles.

For the case in which on-demand crossing program 200 determines that connected vehicles cannot re-position to be in front of non-connected vehicles (step 265 "NO" branch), on-demand crossing program 200 sends an instruction to connected vehicles to reduce speed and includes instructions explaining the action (step 235). In some embodiments, on-demand crossing program 200 continues to receive sensor data from the connected vehicles, which eventually indicates the non-connected vehicles have traveled outside the proximity of sensor detection of the connected vehicles and continue to approach the geo-location of the requesting user intending to cross the roadway. In embodiments in which the connected vehicles cannot adjust to achieve a position in front of the non-connected vehicles, on-demand crossing program 200 maintains a "wait to cross" message to the smart device of the requesting user until the non-connected vehicles have passed the geo-location and confirmation of the connected vehicles slowing down and/or stopping is confirmed.

For example, on-demand crossing program 200 determines that connected vehicles 130a, 130b, and 130c cannot maneuver the respective locations to re-position in front of non-connected vehicle 140 (not depicted in FIG. 1). On-demand crossing program 200 continues to receive sensor data from connected vehicles 130a, 130b, and 130c to determine the location and speed of non-connected vehicle 140 and sends an instruction to connected vehicles 130a, 130b, and 130c to reduce speed and/or stop prior to reaching geo-location 160. In the current example, on-demand crossing program 200 maintains a "wait to cross" message to user interface 115 of client device 110 of requesting user 105 until the position of the connected vehicles indicates that the non-connected vehicles have passed geo-location 160.

For the case in which on-demand crossing program 200 determines that connected vehicles can re-position to be in front of non-connected vehicles (step 265 "YES" branch), on-demand crossing program 200 instructs the connected vehicles to re-position in front of the non-connected vehicles (step 270). In response to receiving a confirmation that one or more of the connected vehicles are safely able to re-position in front of the non-connected vehicles, on-demand crossing program 200 sends an instruction to the connected vehicles to re-position in front of the non-connected vehicles and receives a confirmation when the connected vehicles have successfully repositioned. A safe blocking effect for roadway crossing is provided by positioning one or more of connected vehicles in front of non-connected vehicles as the connected vehicles perform speed reduction and/or stop.

For example, on-demand crossing program 200 determines that connected vehicle 130c can safely maneuver to re-position in front of non-connected vehicle 140. On-demand crossing program 200 instructs connected vehicle 130c to maneuver and re-position in front of non-connected vehicle 140. On-demand crossing program 200 receives a confirmation message from connected vehicle 130c subsequent to connected vehicle 130c successfully re-positioning in front of non-connected vehicle 140. On-demand crossing program 200 continues to receive sensor data from connected vehicles 130a, 130b, and 130c to determine the location and speed of connected vehicles 130a, 130b, and 130c and non-connected vehicle 140, prior to reaching geo-location 160.

On-demand crossing program 200 sends an instruction to the connected vehicles approaching the geo-location of the requesting user to reduce speed and includes a message explaining the instruction to reduce speed (step 235). On-demand crossing program 200 sends instructions to the connected vehicles approaching the geo-location of the requesting user to reduce speed and/or stop, and the included message explains the vehicle is approaching a location at which a user requested safe crossing of the roadway. In some embodiments, the message is an audio message, whereas in other embodiments the message is a displayed textual message. In yet other embodiments, the message is delivered to the connected vehicles as both an audio and textual message.

For example, on-demand crossing program 200 sends instructions and an explanation of the instructions to connected vehicles 130a, 130b, and 130c. The instructions are to reduce speed and/or stop as the respective vehicles approach geo-location 160, and the message indicates a pedestrian crossing of roadway 170 has been requested. In the current example, connected vehicles 130a and 130b are manually-driven connected vehicles and receive audible instructions to begin reducing speed and to stop within a designated distance prior to reaching geo-location 160, and an audible explanation of a roadway crossing request ahead. In the current example, connected vehicle 130c is an autonomous vehicle and instructions sent from on-demand crossing program 200 to connected vehicle 130c automatically reduce the speed of the vehicle and include an audible and text message explaining the requested roadway crossing ahead.

On-demand crossing program 200 determines whether the connected vehicles comply with the instructions to reduce speed (and/or stop; decision step 240). On-demand crossing program 200 continuously communicates with connected vehicles 130a, 130b, and 130c receives location information and determines whether the respective speed and location of the connected vehicles indicate a reduction of speed as the connected vehicles approach the geo-location. The change of location of the connected vehicles as a function of time enables on-demand crossing program 200 to determine the rate of change of the respective vehicle speed and the position and speed of the connected vehicles indicates compliance or non-compliance with the instructions sent from on-demand crossing program 200.

For the case in which on-demand crossing program 200 determines that the connected vehicles have not complied with the instruction to reduce speed, or a non-connected vehicle is positioned between the connected vehicles and the geo-location of the requesting user (step 240, "NO" branch) on-demand crossing program 200 maintains transmission of a warning message, such as "wait to cross," to the smart device of the requesting user until on-demand crossing program 200 confirms the connected vehicles have reduced speed and/or stopped prior to reaching the geo-location message (step 255).

For example, on-demand crossing program 200 receives location data from connected vehicle 130c indicating that the travel speed of connected vehicle 130c has not been reduced as the vehicle approaches geo-location 160. On-demand crossing program 200 maintains a warning transmitted via transmission tower 190 and network 150 to client device 110 for requesting user 105 to "wait to cross," or similar warning message. In some embodiments, on-demand crossing program 200 monitors the location data of connected vehicle 130c, waiting for the vehicle to pass geo-location 160, and determines if other connected vehicles, such as connected vehicles 130a and 130b have reduced speed and/or stopped prior to reaching geo-location 160.

For the case in which on-demand crossing program 200 determines that the requesting user has not crossed the roadway or has canceled the request for an on-demand crossing (step 245, "NO" branch), on-demand crossing program returns to step 235 and continues to send an instruction to the connected vehicles to reduce speed and includes an explanation of the instruction to reduce speed. On-demand crossing program 200 proceeds from step 235 as described below.

In some embodiments of the present invention, on-demand crossing program 200 also maintains a "wait" message transmitted to the smart device of the requesting user. In some embodiments, subsequent to a predetermined threshold of time expiring and on-demand crossing program 200 determining that the smart device of the requesting user has not indicated a location change to the opposite side of the roadway, on-demand crossing program 200 assumes the requesting user is no longer intending to cross the roadway and sends a notification to the smart device of the requesting user stating that the request for roadway crossing has expired, the traffic flow is resuming, and for the requesting user to not cross the roadway. On-demand crossing program 200 verifies the connected vehicles are complying with instruction to reduce speed and/or stop and determines that the user has not crossed the roadway or canceled the request, and with the expiration of the threshold of predetermined time reducing speed or stopping the connected vehicles, on-demand crossing program 200 sends an instruction for connected vehicles to resume travel.

In some embodiments, on-demand crossing program 200 calculates an estimate of the crossing speed of the user based on tracking the device of the user during the historic crossings of the roadway. In some embodiments, traffic flow interruptions are buffered, permitting a predetermined minimum time to expire between acting on multiple requests for crossings of the roadway requested within a predetermined distance of each other.

For the case in which on-demand crossing program 200 determines that the connected vehicles comply with the instructions to reduce speed and/or stop (step 240, "YES" branch), on-demand crossing program 200 determines whether the requesting user has crossed the roadway or canceled the request to cross (decision step 245). In some embodiments of the present invention, on-demand crossing program 200 continuously receives location data from the smart device of the requesting user. On-demand crossing program 200 determines whether the requesting user's position indicates successfully crossing the roadway as compared to the location data received from the smart device of the requesting user. In some embodiments, on-demand crossing program 200 determines that the user has indicated a cancelation of the request to cross the roadway, submitted from an application of the requesting user's smart device. Having determined that at least one of two actions have occurred, which include the action of the requesting user successfully the crossing of the roadway as determined by the change of location of the device of the user, or receiving a canceling message for the request for an on-demand crossing of the device of the user (step 245, "YES" branch), on-demand crossing program 200 sends instructions to the connected vehicles to resume travel (step 250), and on-demand crossing program 200 ends.

For example, on-demand crossing program 200 receives GPS location data from client device 110 of requesting user 105. On-demand crossing program 200 determines that client device 110 is currently in a location that indicates requesting user 105, operating client device 110, has crossed roadway 170. On-demand crossing program 200 sends instructions to connected vehicles 130a, 130b, and 130c to resume travel on roadway 170, and on-demand crossing program 200 ends. For an additional example, on-demand crossing program 200 receives a cancelation message from client device 110 of user 105. On-demand crossing program 200 sends a message to client device 110 informing and warning of the traffic flow resuming on the roadway, and on-demand crossing program 200 sends instructions to connected vehicles 130a, 130b, and 130c to resume travel on roadway 170, and on-demand crossing program 200 ends.

Figure 3:
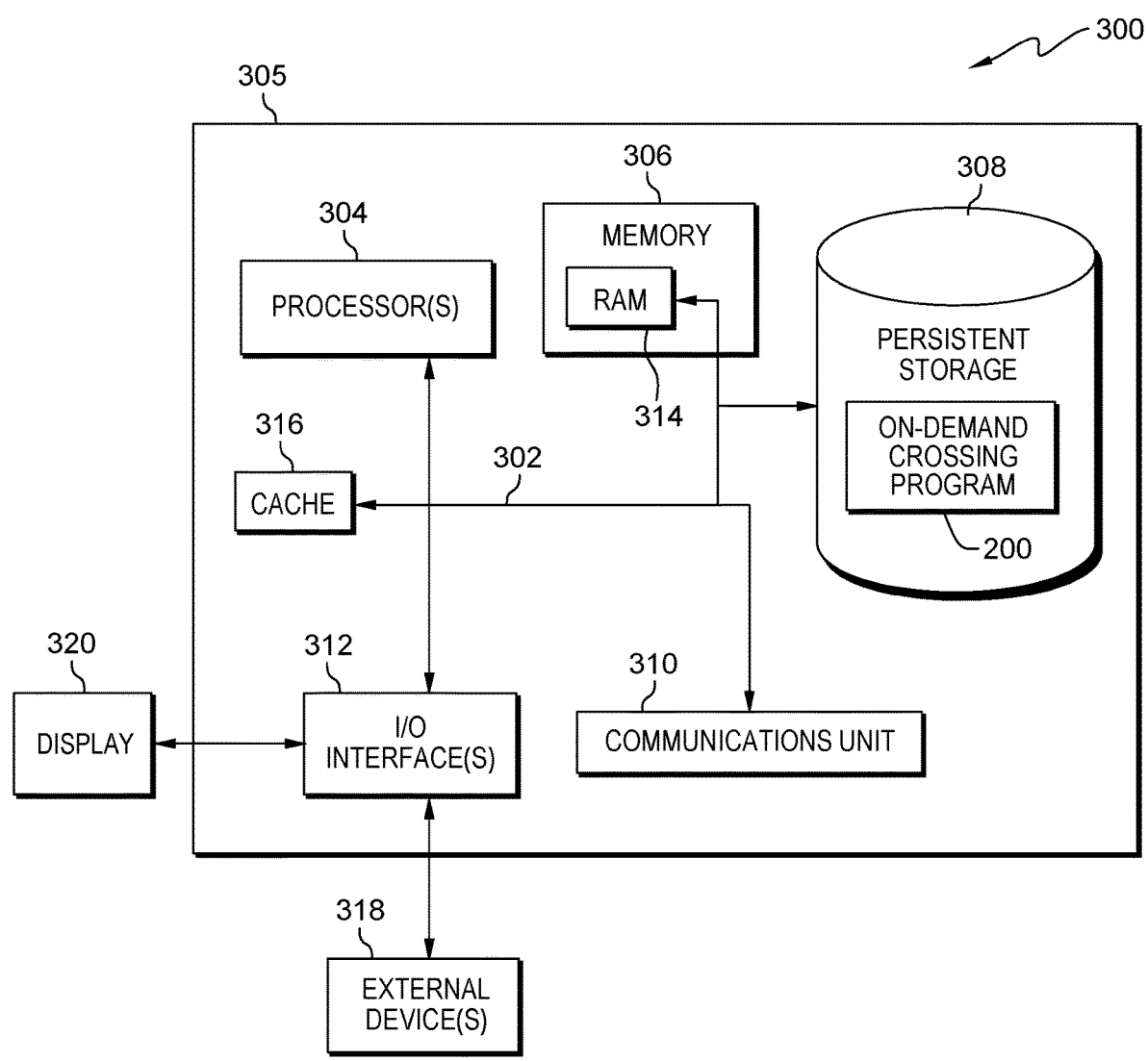
FIG. 3 depicts a block diagram of components of a computing system, including a computing device configured with the capability to operationally perform the crosswalk program of FIG. 3, in accordance with an embodiment of the present invention.

FIG. 3 depicts a block diagram of components of computing system 300, including computing device 305 configured to include or operationally connect to components depicted in FIG. 1, and with the capability to operationally perform the on-demand crossing program 200 of FIG. 2, in accordance with an embodiment of the present invention.

Computing device 305 includes components and functional capability similar to components of client device 110 and server 120, (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment, on-demand crossing program 200, and components of the onboarding procedure are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed data processing environment 100. In these examples, communications unit 310 includes one or more network interface cards. Communications unit 310 may provide communications through the use of either or both physical and wireless communications links. On-demand crossing program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., on-demand crossing program 200 can be stored on such portable computer-readable storage media and can be loaded onto persistent storage 308 via I/O interface(s) 312. I/O interface(s) 312 also connects to a display 320.

Display 320 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for safe roadway crossing on-demand, the method comprising:
   in response to receiving a request from a device of a user for an on-demand crossing of a roadway at a geo-location of the device of the user, determining, by one or more processors, whether vehicles on the roadway that are communicatively connected to a network are approaching the geo-location of the device of the user;
   in response to determining that the connected vehicles are approaching the geo-location of the device of the user, determining, by the one or more processors, a distance of the connected vehicles from the device of the user and a travel speed of the connected vehicles;
   sending, by the one or more processors, an instruction to the connected vehicles to reduce the travel speed, including a communication explaining a purpose of reducing speed;
   determining, by the one or more processors, whether the connected vehicles comply with the instruction; and
   in response to determining the connected vehicles comply with the instruction, sending, by the one or more processors, a safe-to-cross message to the device of the user.

2. The method of claim 1, further comprising:
   detecting, by the one or more processors, whether a non-connected vehicle is within a predetermined proximity of the vehicles on the roadway that are communicatively connected to a network approaching the geo-location of the device of the user;
   in response to detection of the non-connected vehicle within the predetermined proximity of the connected vehicles, determining, by the one or more processors, whether the non-connected vehicle is currently positioned between the connected vehicles and the geo-location of the device of the user, based on a detection sensor capability of the connected vehicles;
   determining, by the one or more processors, whether one or more of the connected vehicles can achieve a position in front of the non-connected vehicle currently positioned between the connected vehicles and the geo-location of the device of the user; and
   in response to determining that the one or more of the connected vehicles can achieve the position in front of the non-connected vehicle currently positioned between the connected vehicles and the geo-location of the device of the user, instructing, by the one or more processors, the one or more of the connected vehicles to achieve the position in front of the non-connected vehicle.

3. The method of claim 1, further comprising:
   in response to sending the safe-to-cross message to the device of the user, tracking, by the one or more processors, the geo-location of the device of the user;
   determining, by the one or more processors, whether an action is detected, wherein the action is selected from the group consisting of: (i) the device of the user being positioned on a side of the roadway opposite that of a position of the device of the user at a receipt of the request to cross the roadway, and (ii) a cancelation of the request to cross the roadway received from the device of the user;
   in response to determining detection of the action, sending, by the one or more processors, a notification warning that traffic flow is resuming to the device of the user; and
   sending, by the one or more processors, a resume travel instruction to the connected vehicles.

4. The method of claim 1, further comprising:
   determining, by one or more processors, a crossing speed of the user from historic crossings based on tracking of a location of the device of the user.

5. The method of claim 1, wherein interruption of traffic flow is buffered permitting a predetermined minimum time expiration between acting on multiple requests for crossing having geo-locations within a predetermined distance of each other.

6. The method of claim 2, wherein the connected vehicles identify a position of the non-connected vehicle relative to the connected vehicles, based on the detection sensor capability of the connected vehicles.

7. The method of claim 6, wherein the detection sensor capability of the connected vehicles includes one or a combination selected from the group consisting of: optical sensors, cameras configured with optical recognition functionality, radar sensors, light detection and ranging (LiDAR) sensors, sonar sensors, and ultrasound sensors.

8. The method of claim 1, wherein the connected vehicles include autonomous vehicles, and the instruction sent to the connected vehicles to reduce the travel speed is performed automatically by the connected vehicles.

9. The method of claim 2, wherein the connected vehicles include autonomous vehicles, and the instruction to the connected vehicles to achieve the position in front of the non-connected vehicle is performed automatically by the connected vehicles.

10. A computer program product for safe roadway crossing on demand, the computer program product comprising:
    one or more computer-readable storage media, and program instructions, executable by a computer processor, stored on the one or more computer-readable storage media, the program instructions comprising:
      in response to receiving a request from a device of a user for an on-demand crossing of a roadway at a geo-location of the device of the user, program instructions to determine whether vehicles on the roadway that are communicatively connected to a network are approaching the geo-location of the user;
      in response to determining the connected vehicles are approaching the geo-location of the user, program instructions to determine a distance of the connected vehicles from the user and a travel speed of the connected vehicles;
      program instructions, sent to the connected vehicles, to reduce the travel speed and the program instructions including a communication explaining a purpose of reducing speed;
      program instructions to determine whether the connected vehicles comply with the program instructions to reduce the travel speed; and
      in response to determining the connected vehicles comply with the program instructions to reduce the travel speed, program instructions to send a safe-to-cross message to the device of the user.

11. The computer program product of claim 10, further comprising:
    program instructions to detect whether a non-connected vehicle is within a predetermined proximity of the connected vehicles approaching the geo-location of the device of the user;
    in response to detection of the non-connected vehicle within the predetermined proximity of the connected vehicles, program instructions to determine whether the non-connected vehicle is currently positioned between the connected vehicles and the geo-location of the device of the user, based on a detection sensor capability of the connected vehicles;

program instructions to determine whether one or more of the connected vehicles can achieve a position in front of the non-connected vehicle currently positioned between the connected vehicles and the geo-location of the device of the user; and in response to determining that the one or more of the connected vehicles can achieve the position in front of the non-connected vehicle currently positioned between the connected vehicles and the geo-location of the device of the user, program instructions to achieve the position in front of the non-connected vehicle, sent to the one or more of the connected vehicles.

12. The computer program product of claim 10, further comprising:

in response to sending the safe-to-cross message to the device of the user, program instructions to track the geo-location of the device of the user;

program instructions to determine whether an action is detected, wherein the action is selected from the group consisting of: (i) the device of the user being positioned on a side of the roadway opposite that of a position of the device of the user at a receipt of the request to cross the roadway, and (ii) a cancelation of the request to cross the roadway received from the device of the user;

in response to determining detection of action, program instructions to send a notification warning that traffic flow is resuming to the device of the user; and program instructions to resume travel, sent to the connected vehicles.

13. The computer program product of claim 10, further comprising:

program instruction to determine a crossing speed of the user from historic crossings based on tracking of a location of the device of the user.

14. The computer program product of claim 10, wherein interruption of traffic flow is buffered permitting a predetermined minimum time expiration between acting on multiple requests for crossing having geo-locations within a predetermined distance of each other.

15. A computer system for safe roadway crossing on demand, the computer system comprising:

one or more computer processors;

one or more computer-readable storage media, and program instructions stored on the one or more computer-readable storage media executed by the one or more processors, the program instructions comprising:

in response to receiving a request from a device of a user for an on-demand crossing of a roadway at a geo-location of the device of the user, program instructions to determine whether vehicles on the roadway that are communicatively connected to a network are approaching the geo-location of the user;

in response to determining that the connected vehicles are approaching the geo-location of the user, program instructions to determine a distance of the connected vehicles from the device of the user and a travel speed of the connected vehicles;

program instructions, sent to the connected vehicles, to reduce the travel speed, and include a communication explaining a purpose of reducing the travel speed;

program instructions to determine whether the connected vehicles comply with reduction of the travel speed; and in response to determining the connected vehicles comply with the reduction of the travel speed, program instructions to send a safe-to-cross message to the device of the user.

16. The computer system of claim 15, further comprising:

program instructions to detect whether a non-connected vehicle is within a predetermined proximity of the connected vehicles approaching the geo-location of the device of the user;

in response to detection of the non-connected vehicle within the predetermined proximity of the connected vehicles, program instructions to determine whether the non-connected vehicle is currently positioned between the connected vehicles and the geo-location of the device of the user, based on a detection sensor capability of the connected vehicles;

program instructions to determine whether one or more of the connected vehicles can achieve a position in front of the non-connected vehicle currently positioned between the connected vehicles and the geo-location of the device of the user; and in response to determining that the one or more of the connected vehicles can achieve the position in front of the non-connected vehicle currently positioned between the connected vehicles and the geo-location of the device of the user, program instructions to achieve the position in front of the non-connected vehicle, sent to the one or more of the connected vehicles.

17. The computer system of claim 16, wherein the connected vehicles identify a position of the non-connected vehicle relative to the one or more of the connected vehicles, based on the detection sensor capability of the connected vehicles.

18. The computer system of claim 16, wherein the detection sensor capability of the connected vehicles includes one or a combination selected from the group consisting of: optical sensors, cameras configured with optical recognition functionality, radar sensors, LiDAR sensors, sonar sensors, and ultrasound sensors.

19. The computer system of claim 15, wherein the connected vehicles include autonomous vehicles, and the reduction of the travel speed of the connected vehicles is performed automatically.

20. The computer system of claim 15, further comprising:

in response to sending the safe-to-cross message to the device of the user, program instructions to track the geo-location of the device of the user;

program instructions to determine whether an action is detected, wherein the action is selected from the group consisting of: (i) the device of the user being positioned on a side of the roadway opposite that of a position of the device of the user at a receipt of the request to cross the roadway, and (ii) a cancelation of the request to cross the roadway received from the device of the user;

in response to determining detection of the one of the two actions, program instructions to send a notification warning that traffic flow is resuming to the device of the user; and program instructions to resume travel, sent to the connected vehicles.

* * * * *